United States Patent [19]

Cruea

[11] 4,097,382
[45] Jun. 27, 1978

[54] DEWATERING SCREEN

[75] Inventor: Ronald DeWayne Cruea, Carlisle, Ohio

[73] Assignee: The Black Clawson Company, Middletown, Ohio

[21] Appl. No.: 781,729

[22] Filed: Mar. 28, 1977

[51] Int. Cl.² ............................................ B01D 35/28
[52] U.S. Cl. .................................... 210/456; 209/264; 209/281; 210/497 R
[58] Field of Search .................. 210/455, 456, 497 R, 210/248; 209/261, 264, 274, 281

[56] References Cited

U.S. PATENT DOCUMENTS

| 1,333,127 | 3/1920 | Nall | 209/281 X |
| 2,732,941 | 1/1956 | Deiss | 209/261 |

FOREIGN PATENT DOCUMENTS

| 476,880 | 9/1951 | Canada | 209/281 |
| 2,510,254 | 9/1975 | Germany | 210/455 |

Primary Examiner—William A. Cuchlinski, Jr.
Attorney, Agent, or Firm—Biebel, French & Nauman

[57] ABSTRACT

Screening apparatus that provides improved dewatering of liquid slurries includes a plurality of spaced, ridge-shaped flow disruption elements secured to the vertical side walls of the screening apparatus and a plurality of deflector elements disposed along the back convex surface of the screen extending across substantially the entire width of the screen parallel to and in engagement with bar-shaped members forming the screen. The flow disruption elements cause the thick slurry which otherwise sluices along the side guide surfaces of the screening device without being completely subjected to the screen action to be directed or diverted inwardly towards the active surface of the screen. The deflector elements cause the thruput water flowing down the back convex side of the screen which has passed through the screen to be diverted and captured in a container underneath the screen without running the entire length of the screen and tending to inhibit the water from passing through the screen on the downstream side of the deflector.

11 Claims, 12 Drawing Figures

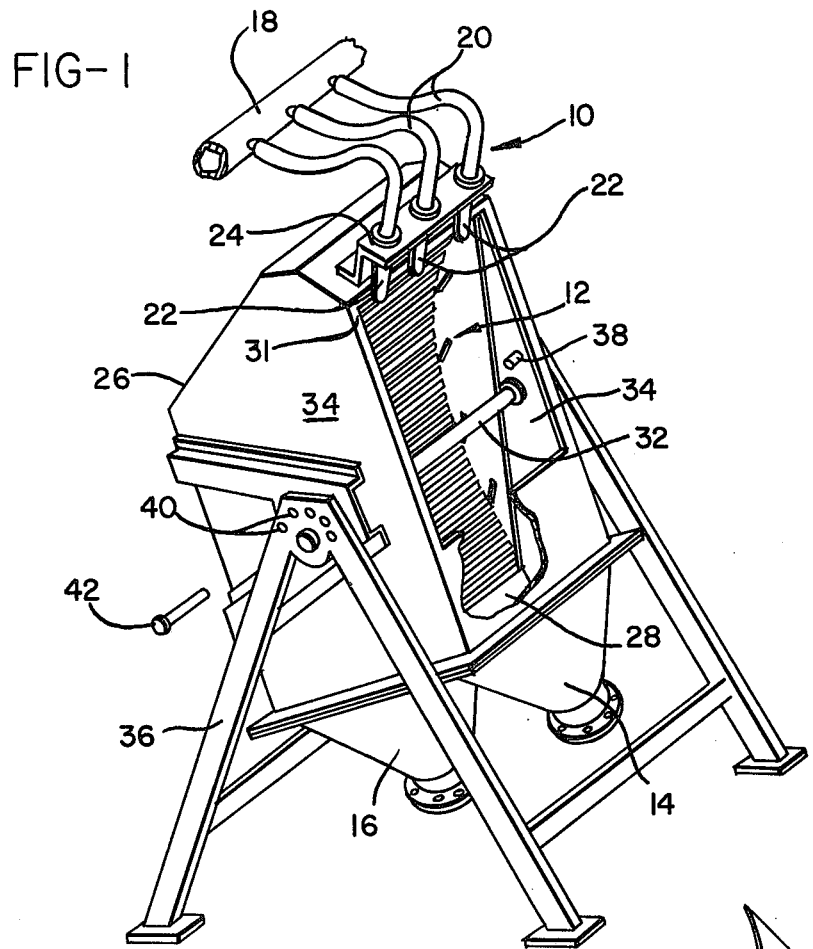
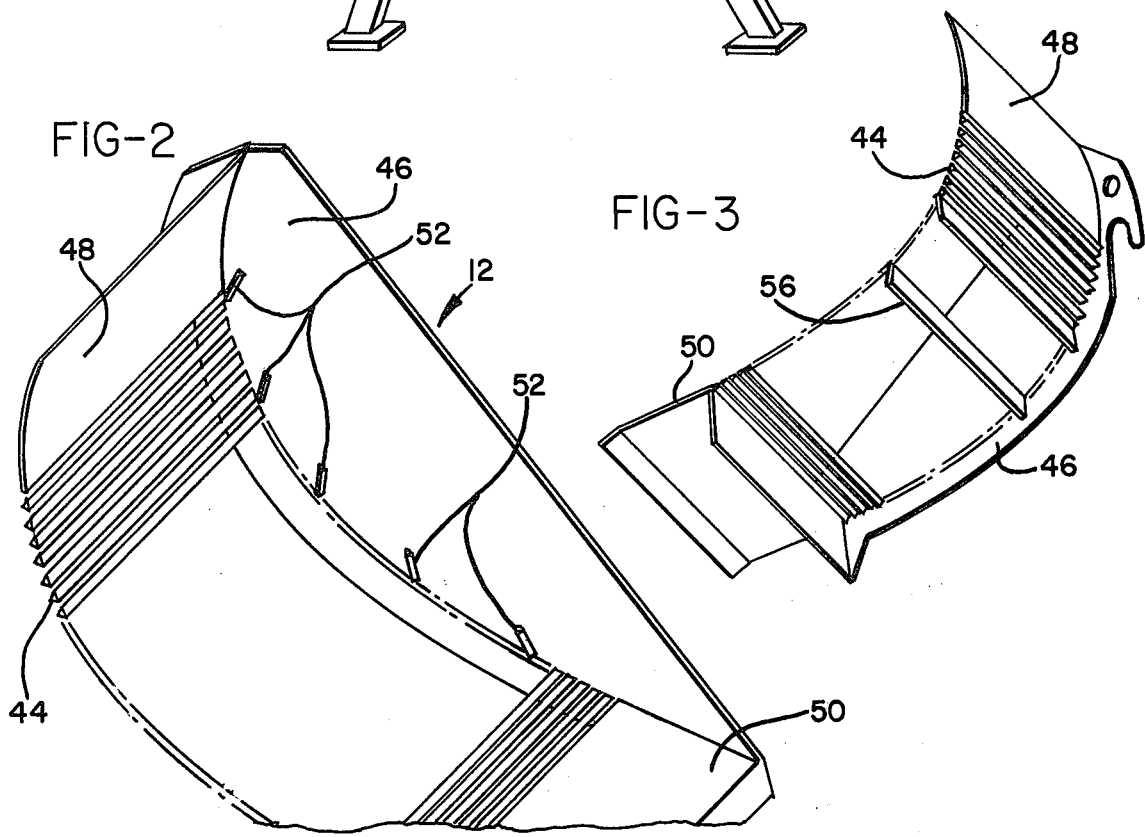

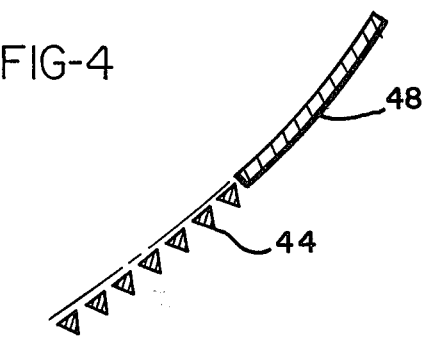
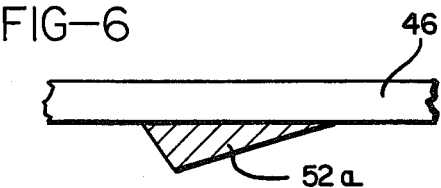
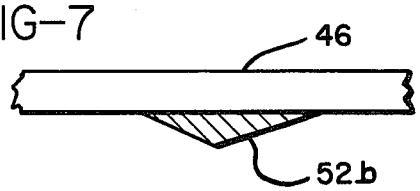
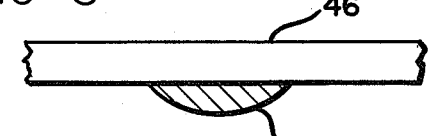
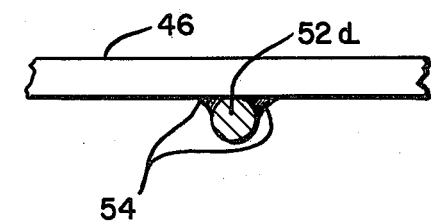
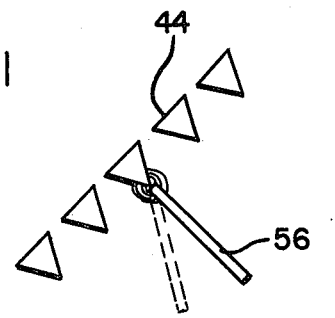
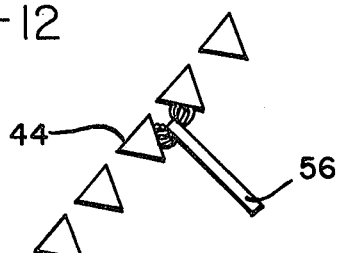
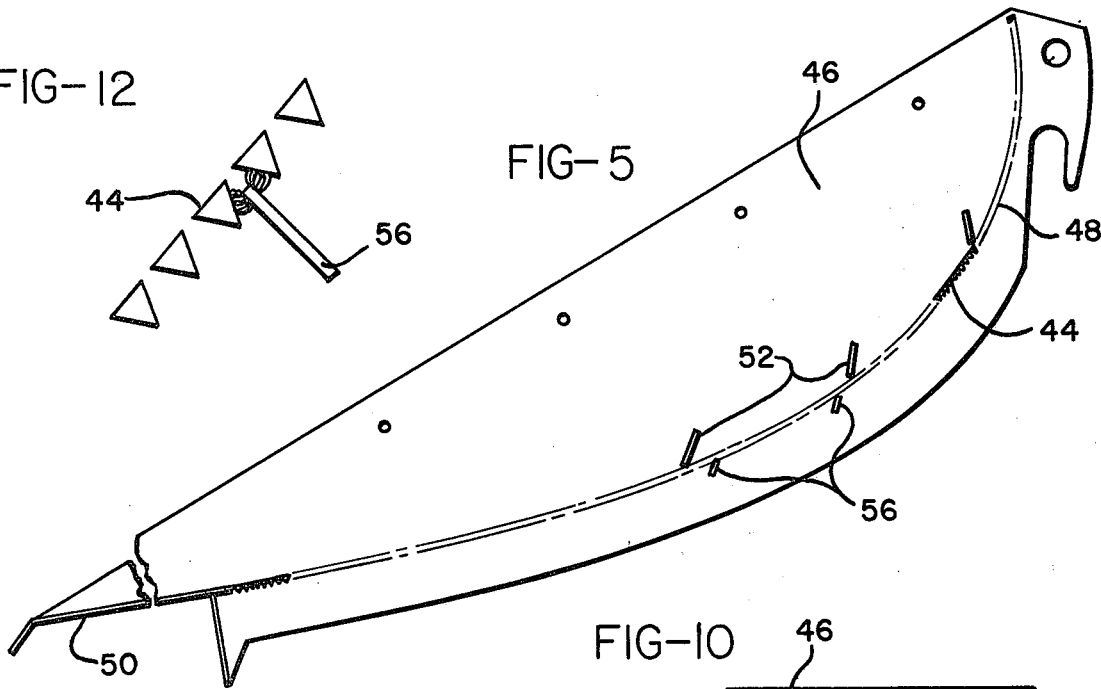
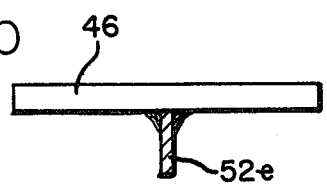

DEWATERING SCREEN

BACKGROUND OF THE INVENTION

1. Field of the Invention

This invention relates to screening devices for separating liquids and dispersed solids from liquid slurries, and more particularly, to an improved dewatering screen of the stationary screen type.

2. Cross Reference to Related Application

The present invention is believed to be particularly useful when used on the dewatering screen apparatus disclosed in U.S. patent applications of Theodore E. Detcher Ser. No. 614,885 now abandoned and replaced by Ser. No. 799,555 and Arthur J. Sternby et al, Ser. No. 706,583 copending herewith and assigned to the same assignee.

PRIOR ART

Stationary dewatering screens of the type disclosed for example, in U.S. Pat. No. 2,916,142, have been in use for many years for the separation of fine particulate matter and water from courser particles found in the liquid slurry, such as is encountered in the paper pulp industry. These screens basically consist of a plurality of rectangular or trapezoidal cross sectioned rods disposed in spaced, horizontal parallel relation so as to form the generatricies of a concave surface of cylindrical or other cross section along the flow path of the liquid slurry which flows over this concave surface.

As a layer of liquid slurry passes over this series of spaced parallel bars, a large portion of the liquid, containing smaller particles which are able to pass between the bars, passes through the screening device and out the back convex side so as to be collected in a container for disposal or recycling, while the courser material with some retained liquid passes off the end of the concave surface and is collected for subsequent use.

The screen, regardless of configuration, is generally bounded on each side by substantially vertical guide surfaces that maintain the flow of liquid slurry between them. One disadvantage associated with this type of construction is that the portion of liquid slurry which flows over the screening surface adjacent the guide surfaces tends to sluice or form a channel which does not separate as completely as does the liquid slurry passing through the central portion of the screening apparatus. This is believed to be due to the adhesive interaction between the slurry and the vertical guide surfaces which abut the screen along the side portions thereof.

A further inefficiency which is inherent in such prior art devices is the fact that the water and smaller particulate matter passing through the upper portion of the screen tends to adhere to the back concave surface thereof, and flow downwardly toward the bottom of the screen, reducing the efficiency of subsequent portions of the screen. Both water and suspending particles which cling to the back side of the screen tend to interfere with the passage of water through the screen, particularly in the lower portions thereof.

SUMMARY OF THE INVENTION

The present invention overcomes the above described difficulties and disadvantages associated with these prior art devices by providing two improvements over such devices.

One of the improvements is the use of a plurality of spaced, ridge-shaped flow disruption members secured to guide surfaces disposed on each side of the screening device. A plurality of the disruption members are preferably spaced along these guide surfaces and extend upwardly along the sides of the guide surfaces a sufficient distance to be above the maximum thickness of slurry which will flow over the screens at that point. The bottom edges of the flow disruption members preferably abut the screen where the guide surfaces almost meet or meet the screen so that all of the slurry flowing along the sides of the screen will be moved inwardly towards the center of the screen.

The width of the disruption members perpendicular to the guide surfaces, i.e. extending laterally into the flowing slurry, is designed to be sufficient to divert a substantial portion of the liquid slurry, which would otherwise flow along the edge portion of the concave surface of the screening device adjacent the guide surfaces and would thus be less subject to screening, in toward the central portion of the flow so that it will be subjected to the screening action of the screening device. However, the width of the flow disruption members should not be great enough to cause any substantial flow disruption to the main body of slurry passing over the screen since that would reduce the overall efficiency of the screening device.

Several cross sectional shapes of the flow disruption members are acceptable, for example, triangular, semicircular or rectangular. The basic criterion for utilization of any shape is that the configuration does not produce a stagnant flow area behind the disruption member, either along the guide surface or on the screening surface, which would trap fibers in crevices.

A further improvement of the present invention, over the prior art devices of the type mentioned above, is the use of a plurality of deflector members disposed along the convex surface of the screening means and extending across substantially the entire width of the screening surface, parallel in engagement with at least one of the bar-shaped members forming the screening surface, for deflecting that portion of the liquid slurry which passes through the screening surface prior to the deflector member from traveling downstream along the convex surface beyond the location of the deflector member which it first contacts. In other words, the deflector member causes the water passing through the screening surface above the position of the deflector device to be deflected into the collector below the screen so that it does not continue to flow along the back convex surface of the screen where it would inhibit the flow through the screen of additional water downstream of the deflector member.

Each deflector member is preferably a thin plate of rectangular cross section which extends across the screen and is secured to an individual screen element making up the screen surface, so that the deflector member does not interfere with the passage of water between adjacent screening elements. The deflector member should be so positioned that the water will naturally tend to flow off the deflector member into the collecting device rather than to accumulate adjacent the deflector device on the back surface of the screening means.

BRIEF DESCRIPTION OF THE DRAWINGS

FIG. 1 is a pictorial illustration of a preferred embodiment of the separating apparatus of the present invention;

FIG. 2 is a pictorial illustration of a portion of the embodiment of FIG. 1 illustrating the screening surface and an adjacent guide surface;

FIG. 3 is a pictorial illustration of the back side of the screening surface and the guide surface of the embodiment illustrated in FIG. 1;

FIG. 4 is a side elevational view in partial cross section of the screen and guide surface of the embodiment illustrated in FIG. 1;

FIG. 5 is an enlarged side elevational view in cross section of a portion of the screening means and guide surface of the embodiment of FIG. 1;

FIG. 6 is an enlarged cross sectional view of a first alternative embodiment of the flow disruption means of the present invention;

FIG. 7 is an enlarged cross sectional view of a second alternative embodiment of the flow disruption means of the present invention;

FIG. 8 is an enlarged cross sectional view of a third alternative embodiment of the flow disruption means of the present invention;

FIG. 9 is an enlarged cross sectional view of a fourth alternative embodiment of the flow disruption means of the present invention;

FIG. 10 is an enlarged cross sectional view of a fifth alternative embodiment of the flow disruption means of the present invention;

FIG. 11 is an expanded cross sectional view through the screening means of the preferred embodiment illustrated in FIG. 1, showing one means of attachment of a deflector means of the present invention; and FIG. 12 is an expanded cross sectional view through the screening means of the preferred embodiment illustrated in FIG. 1, but showing an alternative means of attachment of a deflector means thereto.

DETAILED DESCRIPTION OF THE PREFERRED EMBODIMENT

The overall screening apparatus shown in FIG. 1 is generally of the construction disclosed in the above noted Ser. No. 799,555 and includes a slurry feed or input section 10, a screen assembly 12, and a discharge section comprising a discharge means 14 and 16. The principle use of this screening apparatus is to remove fluid and/or small particles in suspension from a slurry. The thickened solids or larger sized solid fractions leave the downstream end of the screening surface of assembly 12 via discharge means 14, and the liquid which passes through the screening surface falls into discharge means 16 and is transported to a collection container (not shown).

Alternatively, this screening apparatus could be used to classify wet particles, in which case the oversized fraction of particles would leave screen assembly 12 via discharge means 14, while the undersized particles and the liquid fraction would pass through the screening surface and out discharge means 16. Thus just about any kind of particle suspension can constitute the slurry to be screened, including fibrous suspension such as paper stock and white water, and non-fibrous suspensions such as starch.

The screening surface of assembly 12 is inclined at an angle to the horizontal which is steep enough to cause the slurry to slide or flow down it by gravity, with no vibrating force being applied to the screen. The angle will also be shallow enough that the slurry will not overflow the screen, and will vary with the type of material being screened. An alternative to gravity feed is pressure feed wherein the slurry is introduced to the screening surface under pressure and thus at a greater velocity than is provided by gravity, and in addition a horizontal velocity component is introduced. Pressure feed allows practically unlimited orientation for the screen, as gravity is no longer relied upon to hold the slurry on the screen.

FIG. 1 illustrates one embodiment of a slurry feed or input section 10, comprising an input pipe or manifold 18 extending from a slurry source (not shown), which distributes the slurry to one or more hoses 20 each connected to a nozzle 22 arranged to feed the slurry to the surface of screen assembly 12. Three hoses are illustrated, but as many hoses can be used as are needed, as long as the slurry is effectively introduced along the width of the screening surface.

Nozzles 22 may be conveniently mounted on a rack or the like, such as rack 24 attached to housing 26. Once mounted and aimed, the nozzles will continue to distribute slurry uniformly to the screening surface of assembly 12 and at a fixed angle with relation to the screening surface. Nozzles may be used to impart a high initial velocity to the slurry, as an aid to dewatering, by uniformly feeding under pressure, or may merely distribute the slurry to the screen such that it is carried down the screen by the force of gravity alone. Further, other pressure feeding and/or distributing means can be employed as an alternative to nozzles, such as a pressure head box or the like, or the flow spreader disclosed in the above noted Ser. No. 706,583.

Screen assembly 12 may be mounted for operation in any conventional screening apparatus, but it is desirable to provide for adjustment of the relation of its screening surface to the vertical. As shown in FIG. 1, screen assembly 12 is mounted in housing 26 by supporting it on the partition 28 between discharge means 14 and 16 and at the top 30 of housing 26. In this way, a screen assembly 11 can be readily replaced when it is worn, and screen assemblies of different characteristics can be interchanged as desired.

Housing 26 is supported for rotational movement by a hinge pin or rod 32, which passes through the side walls 34 of housing 26 and is attached thereto by welding or the like, and through holes in frame 36. By mounting housing 26 for rotation about the axis of rod 32, the angularity of the surface of screen assembly 12 seated in housing 26 can be adjusted as desired in accordance with input slurry conditions and the desired screening results or effects.

In order to hold housing 26 in the selected angular position, a hole 38 is provided in each of side walls 34 of housing 26, and multiple holes 40 are provided in frame 36 in such location that the loci of their axes describe an arc which coincides with the arc described by the movements of the axes of holes 38 when housing 26 is rotated about rod 32. Thus, any angular position may be selected wherein the hole 38 on each side 34 coincides with one of holes 40, and by passing pin 42 through selected holes 38 and 40, the housing is locked in the selected angular position. To adjust or readjust the angularity of screen 12, it is a simple matter to remove pins 42 and realign holes 38 with others of holes 40. Alternatively, more sophisticated means, such as screws, levers, latches, and the like, can be employed to move and hold the housing in various angular positions.

The invention is not limited to any particular shape or material for or way of joining the screening bars. Rectangular or cylindrical shapes can also be used, so long as the bars have exposed flat surface areas defining the screening surface, and the bars can be made from metal, plastic or like material.

The screen assembly 12 is preferably comprised of a plurality of triangular or trapezoidally shaped elongated rods 44 supported at each of their ends by side guide surfaces 46, and are secured thereto such as by welding or the like. The bars 44 are formed into a shape such that one side forms the convex surface of the screening assembly, and are disposed in horizontal spaced relation with the distance between adjacent bars depending upon the particle size which is desired to be removed from the main flow of material over the convex portion of the screen assembly.

At the infeed side of the screen assembly, it is preferable to have a flow distribution plate 48 over which the nozzles 22 initially present the flow of material to reduce the turbulence and so that it spreads out before engaging the screening surface formed by rods 44. Plate 48 is preferably offset in the manner shown in FIG. 4 so that the fluid is introduced very slightly above the surface configuration formed by rods 44 to avoid creation of any turbulence as the material to be screened is introduced to the screening surface.

Likewise, at the discharge end of the screening assembly 12 a discharge plate 50 is provided, if desired, to direct the flow of material into a discharge collection system such as discharge means 14 shown in FIG. 1. A collection system is also provided on the back side of the screening assembly for collecting the water and fine particles which have passed through the screening surface. This collection system is comprised of the housing 26 and discharge means 16.

Having described the general apparatus in which the improvements of the present invention can be utilized, reference will now be made to the preferred embodiment of those improvements.

As mentioned above, there is some sluicing effect along the sides of the screening surfaces adjacent the guide surfaces such that the material does not become fully screened and passes along the side of the screens from the input to the discharge end, thus reducing the capacity and screening efficiency of the system. To eliminate this effect, a plurality of flow disruption members or elements 52, such as those illustrated in FIG. 2, are secured such as by welding or the like to the inside surface of the guide surfaces 46 of the screen assembly 12. These flow disruption members 52 may be of a variety of configurations such as those, for example, illustrated in FIGS. 6-10. The sluicing action is thus minimized by causing the material flowing along the sides of the screening surface to move inwardly toward the center portion of the screening surface, thus subjecting that portion of the slurry to the full screening action of the device.

The flow disruption members 52 are generally rod-shaped members sufficiently long to protrude above the surface of material flowing over the screen, i.e. the height of members 52 perpendicular to the members 44 should be greater than the maximum thickness of the material which would flow over the screen at the point at which the members 52 are attached to the side guide surfaces 46.

The required height of the disruption members 52 perpendicular to the side guide surfaces 46, usually approximately four inches, will vary depending upon the flow rate and the consistency of the slurry material. One way of determining the necessary height of the numbers 52 is by observance of the portion of the slurry flowing along the sides of the guide surfaces over the screening surface to ascertain the width of the portion of slurry which is sluicing down the sides of the screening surface. A plurality of the flow disruption devices should preferably be disposed at equally spaced intervals along the side guide surfaces with their lower end contacting the rods 44 of the screening surface.

Referring again to the specific alternative cross sectional configurations which can be utilized, a triangular shaped rod 44 as shown in either FIG. 6 or 7 may be welded or otherwise secured to the side guide surface 46 so as to provide a smooth uniform flow such as will not cause fiber hang up on the disruption member. Alternatively, hemispherically shaped members such as 52c, illustrated in FIG. 8, may be utilized, or even a rod 52d of circular cross section may be used if some sort of a filler such as a welding bead 54 is provided on both sides of the rod to secure it to the plate and prevent a stagnant flow condition on the upstream or downstream side of the disruption member.

Actually, several other configurations for flow disruption members are possible, the main criteria for design, however, being to prevent fiber hang up and that the configuration be sufficient to force the slurry material which would otherwise sluice down the sides of the screening surface adjacent the guide surface, towards the central portion of the surface of the screening device where it will be fully subjected to the screening action.

In addition to having the disruption member 52 extending laterally into the flow path of the material, they should be angled relative to the tangent to the convex screening surface at the point to which they are attached, as illustrated in FIG. 5. This angle is preferably in the range of 30° to 90° relative to the upstream side of the tangent and is preferably approximately 45°.

As a practical matter, it has been shown in testing a screening device employing the flow distribution members 52 that rods having a width or thickness perpendicularly outward from the side guide surfaces 46 in the range approximately 1/16 to ½ inch is sufficient to provide a flow disruption which will cause substantially all of the material which normally sluices down the side surface of the screening device, to be thoroughly subjected to the screening apparatus for a sufficient time to be screened.

It has also been found that the use of four such disruption members on each side of the screening surface are sufficient to produce the desired effect. The first flow disruption member should be positioned on each side of the screening surface at the juncture of the infeed plate 48 and the first rods 44. A second member should be positioned on each side of the screening surface spaced approximately a quarter of the distance down the remaining portion of the screen, and a third approximately at the center position of the length of screening surface as illustrated in FIG. 5.

The second improvement of the present invention over prior art screening devices is in the use of a plurality of deflector members 56 secured to the back covex side of rods 44 forming the screening assembly 12. A plurality of these members 56 are preferably utilized, which are spaced according to the configuration of the screening surface and depending upon the amount of water which must be deflected from the back side of the surface in order to increase the efficiency of the screening device to the desired level.

The deflector members 56 are preferably of rectangular cross section and are each secured to a single one of the rods 44 forming the screening surface, as shown in FIG. 11, so as not to interfere with the flow of water between the adjacent rods. However, it is possible to secure the deflector members to two adjacent rods as shown in FIG. 12 if this is desired, since it eliminates flow between only a very small percentage of the openings provided by the screening surface and thus does not appreciably reduce efficiency.

With the members 56 applied to the back convex side of the screening surface, the water which normally tends to flow entirely down along the back side of the screening surface to the discharge end thereof will now engage the deflector plates and be deflected into a collecting device behind the screening surface. This prevents the water from flowing along the back of the screening surface on the downstream side of the deflecting member so that it does not inhibit the flow of water between the rods on the downstream side of each deflector member, thus increasing the efficiency of the screening surface.

In other words, as the slurry flows over the concave surface of the screen, water and fine particles in suspension pass between the rods 44 forming the screen and tend to flow along the back side downwardly towards the discharge end of the screen. However, when the water containing fine particles encounters a deflector member 56, it is deflected away from the back side of the screen into a collecting basin. Thus, on the screening surface on the downstream side of the deflector member the water and fine particles will more easily pass through the screening surface because the inhibiting effect of water passing down the back side of the screen has been reduced since only the water which has passed through the screen subsequent to the position of each deflector member will be flowing down the back side of the screen.

The angle at which the deflecting members 56 are secured to the back side of the screening surface is not critical, but should be such that the water should naturally tend to flow off the upstream side of the member 56 into a collecting device and not be retained thereon or form a pocket on the upstream side between the convex side of the screening surface and the upstream side of the member 56. Naturally, other configurations than a rectangular cross section can be utilized for the deflector member 56, so long as it presents a surface on the upstream side which functions as mentioned.

The deflector means 56 should extend substantially entirely across the width of the screening device to maximize efficiency. The deflector member 56 need not be of any particular height perpendicular to the tangent of the convex surface of the screening means at the point of attachment, so long as it is sufficiently high to prevent the water from flowing past it and adhering to the back convex surface of the screen on the downstream side of the deflector member. In addition, members 56 may be equally spaced or may be disposed at a position where, by experimentation it can be ascertained that they are of maximum effectiveness in reducing the inhibiting effect of water flowing along the back convex side of the screening surface.

It has been found in practice that the invention is especially useful, as well as desirable when the slurry is delivered to the top of the screen by means of a flow spreader of the characteristics shown in the above noted Serial No. 706,583, which causes the slurry to be discharged initially from a single outlet located above the center of the screen and then to spread out laterally in both directions as it flows downwardly along the screen.

Although the foregoing illustrates the preferred embodiment of the present invention, other variations are possible. All such variations as would be obvious to one skilled in this art are intended to be included within the scope of the invention as defined by the following claims.

What is claimed is:

1. An apparatus for separating particles from a liquid slurry comprising:

screening means formed of a plurality of parallel spaced horizontally disposed bar-shaped members aligned to form the generatrices of a concave screening surface over which the liquid slurry flows from a top end to a bottom end thereof;

guide means defining a vertical guide surface abutting each side of said screening means for substantially the entire length thereof for maintaining the flow of liquid slurry on said concave surface of said screening means from said top end to said bottom end thereof;

a plurality of spaced ridge-shaped flow disruption means secured to each guide surface adjacent said abutting screening means with lower end portions of each said disruption means in contact with said screening means and extending along and in contact with each said guide surface for a sufficient distance to span the maximum thickness of the liquid slurry passing over said concave surface of said screen at the position where each said disruption means is secured, the width of said disruption means perpendicular to said guide surface being sufficient to divert a substantial portion of the liquid slurry that would otherwise flow on said concave surface of said screening means adjacent said guide surfaces into said central portion of the flow of slurry so that it will be subjected to the screening action of said screening means;

input means for delivering the liquid slurry to said top end of said concave surface of said screening means;

collecting means disposed along the back side of said screening means for capturing the portion of the liquid slurry which passes through said screening means; and output means for receiving from said bottom end of said screening means the portion of the liquid slurry which does not pass through said screening means.

2. An apparatus as defined in claim 1 wherein said flow disruption means includes a plurality of contoured rod-like elements extending longitudinally against the direction of flow of the slurry at not greater than 60° to a plane tangent to said concave surface of said screening means at the position where each said element is secured to said guide surface, said contour being such that a stagnant flow area in the liquid slurry will not develop on the upstream side of said elements.

3. An apparatus as defined in claim 2 wherein said width of said contoured elements is in the range of one sixteenth to one-half inch.

4. An apparatus as defined in claim 1 wherein said flow disruption means includes a plurality of triangular cross sectioned rod-like elements extending longitudinally against the direction of flow of the liquid slurry at not greater than 60° to a plane tangent to said concave surface of said screening means at the position where each said element is secured to said guide surface, said element being secured to said guide surfaces with one side of said elements abutting said guide surfaces and the opposing apex extending into the liquid slurry flow.

5. An apparatus as defined in claim 3 wherein said width of said triangular cross sectional rod like elements is in the range of one sixteenth to one-half inch.

6. An apparatus for separating particles from a liquid slurry, comprising:
   screening means formed of a plurality of parallel spaced, horizontally disposed bar-shaped members aligned to form the generatrices of a concave screening surface over which the liquid slurry flows from a top end to a bottom end thereof, the back side of said screening means forming a convex surface;
   guide means defining a vertical guide surface abutting each side of said screening means for substantially the entire length thereof for maintaining the flow of liquid slurry on said concave surface of said screening means from said top end to said bottom end thereof;
   a plurality of deflector means disposed in spaced relation along said convex surface of said screening means each extending across substantially the width of said screening means parallel to and in engagement with at least one of said bar-shaped members for deflecting that portion of liquid slurry passing through said screening means prior to said deflector means from traveling along said convex surface beyond the location of said deflecting means;
   input means for delivering the liquid slurry to said top end of said screening means;
   collecting means disposed along said back side of said screening means for capturing that portion of the liquid slurry which passes through said screening means and is deflected by said deflecting means; and
   output means for receiving from said bottom of said screening means the portion of the liquid slurry which does not pass through said screening means.

7. An apparatus as defined in claim 6 wherein there are a plurality of said deflector means disposed in spaced relation along said convex surface of said screening means.

8. An apparatus as defined in claim 7 wherein each deflector means includes a rectangular cross sectioned bar-like element rigidly secured to one of said bar-shaped members forming said screening means, the width of said element being less than the width of a said bar-shaped member so that it does not block flow of the liquid slurry through an opening between adjacent said members.

9. An apparatus as defined in claim 7 wherein there are at least two deflector means disposed in spaced relation in the central portion of said screening means remote from said top and bottom ends thereof.

10. An apparatus as defined in claim 7 wherein each element has a rectangular cross section with a back surface of said element facing said top end of said screening means and extending downwardly at an angle sufficient to prevent formation of a stagnant flow area on the upstream side thereof.

11. An apparatus for separating particles from a liquid slurry, comprising:
   screening means formed of a plurality of parallel spaced horizontally disposed bar-shaped members aligned to form the generatrices of a concave screening surface over which the liquid slurry flows from a top end to a bottom end thereof, the back side of said screening means forming a convex surface;
   guide means defining a vertical guide surface abutting each side of said screening means for substantially the entire length thereof for maintaining the flow of liquid slurry on said concave surface of said screening means from said top end to said bottom end thereof;
   a plurality of spaced ridge-shaped flow disruption means secured to each guide surface adjacent said abutting screening means with lower end portions of each said disruption means in contact with said screening means and extending along and in contact with each said guide surface for a sufficient distance to span the maximum thickness of the liquid slurry passing over said concave surface of said screen at the position where said disruption means is secured, the width of said disruption means perpendicular to said guide surface being sufficient to divert a substantial portion of the liquid slurry that would otherwise flow on said concave surface of said screening means adjacent said guide surfaces into the central portion of the flow so that it will be subjected to the screening action of said screening means;
   a plurality of deflector means disposed in spaced relation along said convex surface of said screening means each extending across substantially the width of said screening means parallel to and in engagement with at least one of said bar-shaped members for deflecting that portion of liquid slurry passing through said screening means prior to said deflector means from traveling along said convex surface beyond the location of said deflecting means;
   input means for delivering the liquid slurry to said top end of said screening means;
   collecting means disposed along said back side of said screening means for capturing that portion of the liquid slurry which passes through said screening means and is deflected by said deflecting means; and
   output means for receiving from said bottom of said screening means the portion of the liquid slurry which does not pass through said screening means.

* * * * *

UNITED STATES PATENT AND TRADEMARK OFFICE
CERTIFICATE OF CORRECTION

PATENT NO. : 4,097,382
DATED : June 27, 1978
INVENTOR(S) : Ronald DeWayne Cruea

It is certified that error appears in the above-identified patent and that said Letters Patent are hereby corrected as shown below:

Column 6, line 44, "distribution" should be --disruption--.

Column 6, line 66, "covex" should be --convex--.

Claim 5, line 1, "claim 3" should read --claim 4--

Signed and Sealed this

Twentieth Day of February 1979

[SEAL]

Attest:

RUTH C. MASON
Attesting Officer

DONALD W. BANNER
Commissioner of Patents and Trademarks

Disclaimer and Dedication 4,097,382.—*Ronald DeWayne Cruea*, Carlisle, Ohio. DEWATERING SCREEN. Patent dated June 27, 1978. Disclaimer and Dedication filed Mar. 6, 1980, by the assignee, *The Black Clawson Company*.

Hereby disclaims and dedicates to the Public all claims of said patent.

[*Official Gazette, May 6, 1980.*]